United States Patent [19]
Deininger et al.

[11] Patent Number: 6,109,385
[45] Date of Patent: Aug. 29, 2000

[54] HYDROSTATIC UNIT FOR DRIVING AN INDUSTRIAL TRUCK

[75] Inventors: Horst Deininger, Hörstein-Alzenau; Franz Forster, Karlstadt-Mühlbach, both of Germany

[73] Assignee: Linde Aktiengesellschaft, Germany

[21] Appl. No.: 09/225,109

[22] Filed: Jan. 4, 1999

[30] Foreign Application Priority Data

Jan. 2, 1998 [DE] Germany ................ 198 00 002

[51] Int. Cl.[7] .................................................. B60K 17/00
[52] U.S. Cl. .................... 180/306; 180/242; 180/305; 180/307; 180/308
[58] Field of Search ................................ 081/305, 306, 081/307, 308, 242

[56] References Cited

U.S. PATENT DOCUMENTS

| | | | |
|---|---|---|---|
| 3,485,315 | 12/1969 | Bergren | 180/66 |
| 3,908,377 | 9/1975 | Riedhammer | 60/445 |
| 4,246,832 | 1/1981 | Kotter et al. | 91/444 |
| 4,467,604 | 8/1984 | Forster | 60/484 |
| 4,635,440 | 1/1987 | Kropp | 60/422 |
| 4,843,817 | 7/1989 | Shivvers et al. | 60/487 |
| 4,942,780 | 7/1990 | Fujisaki et al. | 475/83 |
| 4,943,213 | 7/1990 | Forster et al. | 417/310 |
| 5,354,180 | 10/1994 | Forster | 417/199.1 |
| 5,367,877 | 11/1994 | Irikura | 60/435 |
| 5,447,028 | 9/1995 | Azuma et al. | 60/487 |
| 5,513,717 | 5/1996 | Louis et al. | 180/62 |
| 5,616,092 | 4/1997 | Hauser et al. | 475/83 |
| 5,664,465 | 9/1997 | Okada et al. | 74/606 R |

*Primary Examiner*—Brian L. Johnson
*Assistant Examiner*—Deanna Draper
*Attorney, Agent, or Firm*—Webb Ziesenheim Logsdon Orkin & Hanson, P.C.

[57] ABSTRACT

Hydrostatic unit for driving an industrial truck with a pump, a hydrostatic propulsion unit and additional users of hydraulic energy, wherein the pump is located on an axle body of a drive axle. A control valve for the pressurization of the propulsion unit and at least one control valve for the pressurization of an additional user are located on the axle body or at least partly integrating into the axle body. In one embodiment, the axle body is a control seat receptacle of the pump and at least one traction motor of the hydrostatic propulsion unit. The control valves can be actuated electrically or hydraulically.

20 Claims, 2 Drawing Sheets

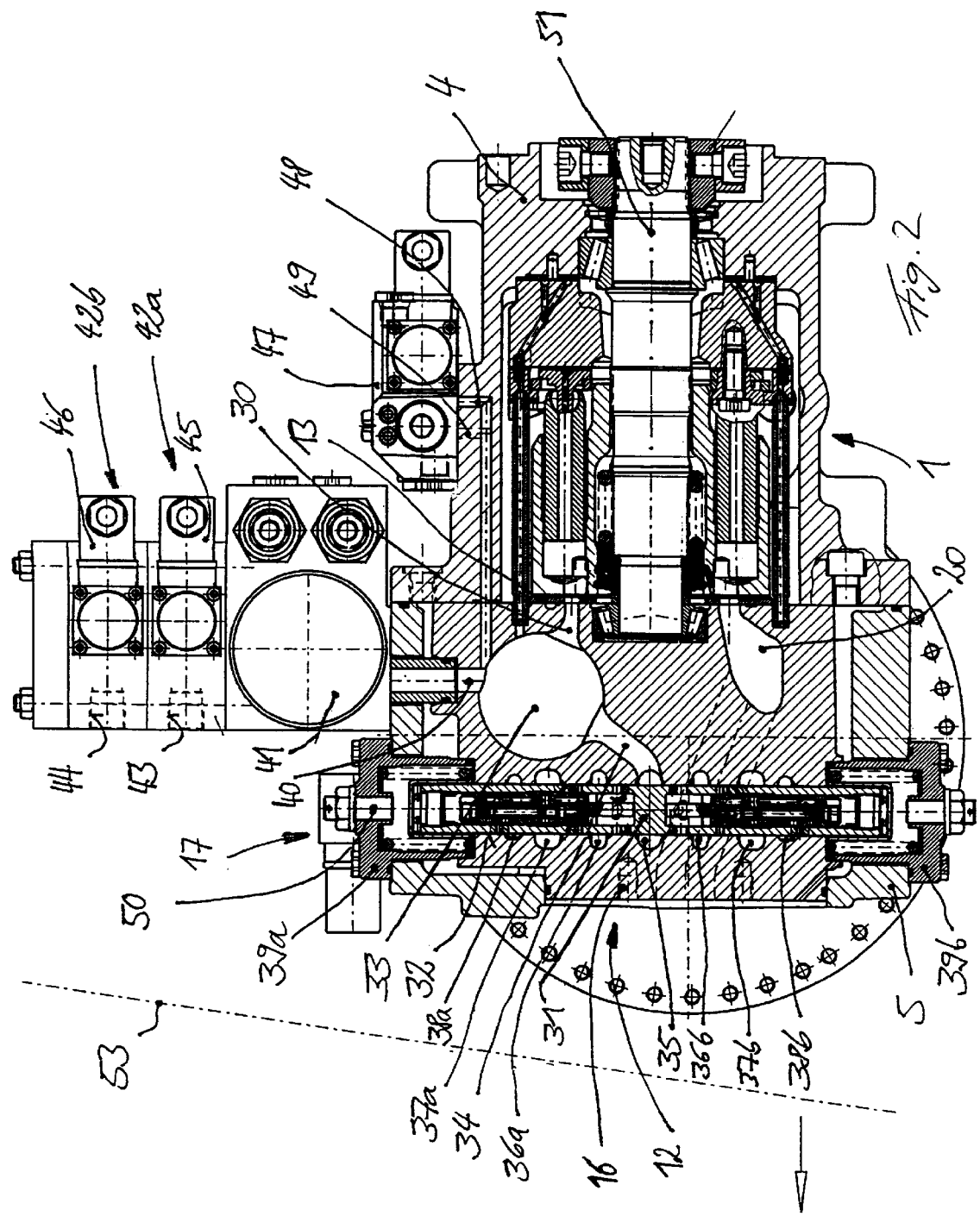

HYDROSTATIC UNIT FOR DRIVING AN INDUSTRIAL TRUCK

BACKGROUND OF THE INVENTION

1. Field of the Invention

The present invention relates to a hydrostatic unit for driving an industrial truck with a pump, a hydrostatic propulsion unit and additional users of hydraulic energy, wherein the pump is located on an axle body of a drive axle.

2. Background Information

A unit of this type, in which the pump is located on the axle housing of the drive axle and supplies a hydrostatic propulsion unit, is also called a hydrostatic compact transmission or a compact axle, and can be installed in a fork lift truck, for example. To supply additional users, for example a hydraulic work unit or a steering system, there is generally at least one auxiliary pump which can also be located on the drive axle. The control valves of the hydraulic work unit are generally actuated manually and are combined into one control block which is located within easy reach of the driver's seat.

The object of the present invention is to make available a hydrostatic unit of the type described above that has a simplified design and construction.

SUMMARY OF THE INVENTION

The present invention teaches that this object can be accomplished by locating a control valve for the pressurization of the propulsion unit and at least one control valve for the pressurization of an additional user on the axle body, or by at least partly integrating them in the axle body.

In a compact axle according to the present invention, the control valve of the propulsion unit and the control valves of the additional users may be flange mounted directly on the drive axle, or integrated at least partly into the drive axle. This construction will locate them in the immediate vicinity of the pump provided for the supply of the propulsion unit and of the additional users. Combinations are also possible in which, for example, one control valve is integrated into the axle body and additional control valves are located on the axle body.

In the invention, the control valves for the actuation of the users are all located together on the compact axle. This arrangement achieves a series of advantages. The location on, or in, the compact axle of the control valves for the actuation of the individual users means that numerous hydraulic lines to the control valves can be eliminated. In addition, the installation and assembly of these lines, such as the attachment of threaded connectors, etc. can also be eliminated. Therefore, the number of potential sources of leaks in the overall system can be drastically reduced. As a result of the integration of individual control valves (or all the control valves) into the axle body, it also becomes possible to eliminate a number of separate valve housings. The location of the control valves of the additional users, such as the control valves of a hydraulic work unit, on the compact axle of the vehicle in a fork lift truck also makes it possible to have short lines that run to the users of the hydraulic work unit, which are generally located on the lifting frame of a fork lift truck in the immediate vicinity of the drive axle. Line losses are thereby reduced, which in turn reduces the energy losses of the drive system, and increases the efficiency of the propulsion system. Overall, the present invention makes it possible to reduce the time, effort and expense involved in manufacture. In particular the time, effort and expense involved in the installation and testing of the individual components is reduced. The elimination of hydraulic line components, such as the hose lines, threaded connectors, etc. also results in an increase in operating safety and reliability. Because the axle housing is generally fastened to a vehicle frame to reduce the structure-borne noise, the same advantages are also automatically achieved for the control valves.

In one embodiment, the axle body is a control seat receptacle of the pump and of at least one traction motor of the hydrostatic propulsion unit. On compact axles in which the pump and the traction motors are located on a common control seat receptacle, the location of the control valves of the present invention makes possible a simple design and construction. This is because it is a simple matter to provide hydraulic channels in the control seat receptacle that can be connected to the control valves. The control seat receptacle can, for example, form or be located in the middle part of the axle body.

In one embodiment, the control valves can be actuated electrically or hydraulically. The control valves can thereby be actuated in a simple manner. It also becomes unnecessary to install complex and expensive mechanical valve actuator mechanisms, the operation of which frequently causes unavoidable vibrations (noise, loosening of connections, need for readjustments, etc.).

In the axle body or the control seat receptacle of the present invention, there is a pressure channel that is connected to the output of the pump, and a suction channel that is connected to a reservoir and is in communication with the inlet of the pump. The pressure channel is connected to the control valve of the propulsion unit and the control valves of the additional users. The control valves located on or integrated into the axle housing of the control seat receptacle can therefore be easily connected to the output of the pump.

In one embodiment of the present invention, there is a priority valve for the priority supply of a user, which priority valve is located on or is integrated into the axle body or the control seat receptacle. The priority valve is located upstream of the control valves. The priority valve ensures that when there is a drive system with a pump, a defined user is provided with a priority supply of hydraulic fluid. The defined user may be, for example, a hydraulic steering device of a vehicle provided with the hydrostatic unit of the present invention. The steering system, which is an important safety component of a vehicle, can therefore always be supplied with the required flow of hydraulic fluid independently of the actuation of other hydraulic users.

Because the various users connected to the pump are designed to operate at different flows and different pressures, in one embodiment of the present invention there is at least one additional valve that is located on or is integrated into the axle body or the control seat receptacle. Depending on the individual application, this valve can be a pressure valve, e.g. in the form of a pressure relief valve, or a flow valve.

The integration of the functions in the compact axle can be increased even further if, located downstream of at least some of the control valves, there are pressure relief valves and/or feeder valves which are located on or are integrated into the axle body or the control seat receptacle. It is thereby possible in a simple manner to limit the user pressure and to prevent cavitation in the users, e.g. in the propulsion unit.

In the present invention, the pressure channel may be connected with a damping compartment. The delivery flow from the pump is thereby smoothed by the effect of the damping compartment. The reduction in pulsations thereby achieved also has the effect of reducing the noise level. The damping compartment can thereby be located on the axle body or the control seat receptacle. The damping compartment can be designed so that it occupies a particularly small amount of space if it is integrated into the axle body or the control seat receptacle.

The control valves may be piston valves or seat valves while retaining the advantages described above.

In one embodiment, the control valve of the propulsion unit is integrated into the axle body or the control seat receptacle and the additional control valves are located on the axle body or the control seat receptacle. The result is a particularly simple construction because the control valve of the propulsion unit, which is designed to carry a high flow of hydraulic fluid, is located directly in the hydraulic fluid channels that lead from the pump to the traction motors and to the reservoir. Therefore, the losses that occur in these channels are relatively small. As a result of the flange-mounting of the control valves of the hydraulic work system on the axle body or the control seat receptacle, conventional control valves can continue to be used.

A distributor block may be located between the axle body, or the control seat receptacle, and the control valves of the additional users. The additional valve may be provided in the distributor block. It thereby becomes possible to connect the additional valves upstream of the control valves of the additional users.

A filter element may be provided and the filter element can be located in the damping compartment, for example. The filter element may be located in the distributor block. Because the distributor block is located on the control seat receptacle or the axle body, the filter element is easily accessible for service and maintenance activities.

In one embodiment of the invention, the longitudinal axis of the control valve of the propulsion unit is oriented perpendicular to the axis of rotation of the pump and perpendicular to the longitudinal axis of the drive axle, and the longitudinal axes of the control valves of the additional users are oriented parallel to the longitudinal axis of the drive axle. The control valve of the propulsion unit is thereby easily accessible. As a result of the orientation of the additional control valves parallel to the longitudinal axis of the drive axle, these additional control valves take up relatively little space.

The pump may be an axial piston pump with an adjustable delivery volume, and the pump may be an axial piston pump that employs the swash plate construction, whereby the axle body or the control seat receptacle has at least one adjustment cylinder that holds an adjustment piston that is in connection with the swash plate of the axial piston machine. The stroke volume adjustment of the pump is thereby also integrated into the axle body or the control seat receptacle.

If a pump in the form of a load-sensing regulating pump is used, a demand flow controller that determines the delivery volume of the pump may be provided, whereby the input and output signals as well as the control signals are transmitted in channels that are located in the control seat receptacle or the axle body.

The hydrostatic unit of the present invention is particularly suitable for use in an industrial truck, in particular a fork lift truck, with a propulsion unit, a hydraulic work unit and a hydraulic steering system. The control valves for the actuation of the propulsion unit and of the hydraulic work unit and the priority valve for the steering system and the valves for the distribution of the flow of hydraulic fluid to the various users as well as the delivery volume adjustment of the pump are thereby located in or on the compact axle. The compact axle thereby essentially unites in itself the hydraulic control system of the fork lift truck.

BRIEF DESCRIPTION OF THE DRAWINGS

Additional advantages and details of the invention are explained in greater detail below with reference to the exemplary embodiment that is illustrated schematically in the accompanying figures, in which:

FIG. 2 is a section along Line A—A in FIG. 1.

DETAILED DESCRIPTION OF THE PREFERRED EMBODIMENTS

Figure 1:
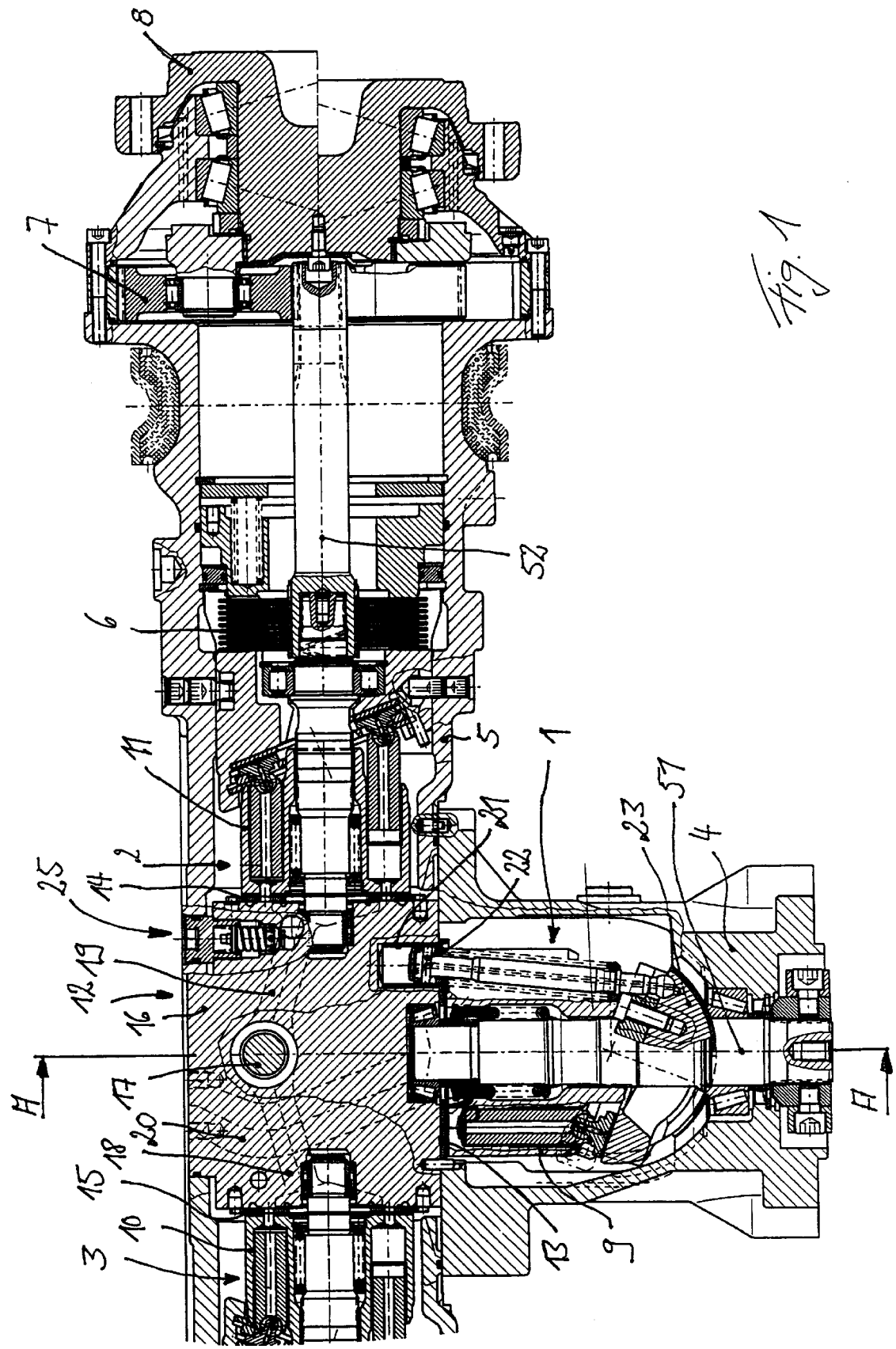
FIG. 1 is a sectional view of a unit according to the present invention.

FIG. 1 shows a section through a drive axle, specifically a compact axle, whereby the figure shows only the center part of the drive axle and the right half of the axle. The left half (only partially shown) of the axle is symmetrical to the right half. The compact axle has a pump 1 and two coaxially oriented traction motors 2 and 3, whereby the pump 1 is located in a housing 4 that is fastened to an axle housing 5. The traction motors 2, 3 are located in the axle housing 5 and are each in communication via a respective brake device 6 and a step-down transmission 7 with a wheel hub 8 that is rotationally fastened to the ends of the axle. The wheel hub 8 is provided for the mounting of a drive wheel.

In the illustrated example, the pump 1 is an axial piston machine that employs the swash plate construction and is operated in an open circuit. The cylinder drum 9 of the pump 1 and the cylinder drums 11, 10 of the traction motors 2, 3 are supported on an axle body 12 located in the center of the axle housing 5. The axle body 12 can be one piece with the axle housing 5 and the axle body 12 can be the central part of the axle housing 5. Alternatively, as illustrated, the axle body 12 can be an independent component of the drive axle. The control surfaces of the pump 1 and of the traction motors 2, 3 are formed on the axle body 12. These control surfaces may be molded directly on the axle body 12 or can be disc cams 13, 14, 15 that are connected to the axle body 12. The axle body 12 thereby represents a common control seat receptacle 16 for the pump 1 and the traction motors 2, 3. The control surfaces of the traction motors 2, 3 are thereby oriented perpendicular to the control surface of the pump 1.

Integrated into the control seat receptacle 16 is a control valve 17 which is in communication via the hydraulic fluid channels 18, 19 illustrated in dotted lines with the control nodules formed on the control cams 14, 15 of the traction motors 2, 3, and is used to actuate the traction motors 2, 3. A valve 25 connected to the hydraulic fluid channel 19 and located in the control seat receptacle 16 can be, for example, a combined pressure relief and feeder valve, in which case it can be used to protect the traction motor 2 and to maintain an adequate level of hydraulic fluid in the traction motor 2.

A suction channel 20 illustrated in dotted lines in the control seat receptacle 16 is in communication with a reservoir (not shown), and is connected in a manner not illustrated in any greater detail to the suction side of the pump 1 and outlet channels of the control valve 17.

Also integrated into the control seat receptacle 16 is the stroke volume adjustment device of the pump 1. For this purpose, an adjusting cylinder 21 is formed inside the control seat receptacle 16, in which an adjusting piston 22 is mounted so that it can move longitudinally and is effectively connected to a pivoting swash plate 23 of the pump 1.

FIG. 2 shows a section along Line A—A in FIG. 1. Fig. shows that the control nodules formed on the cam disc 13 of the pump 1 are connected to the suction channel 20 and a pressure channel 30, both of which are located in the control seat receptacle 16. The control valve 17 is a piston valve with a valve slide 31 which is mounted so that it can move longitudinally in a boring 32 of the control seat receptacle 16. The pressure channel 30 leads to a damping compartment 33 which is connected by a pressure channel 34 to an annular groove 35 of the control valve 17. The control valve 17 has two annular grooves 36a, 36b, wherein the annular groove 36a is in communication with a control nodule on each of the traction motors 2, 3 and the annular groove 36b is in communication with the respective other control nodules on each of the traction motors 2, 3. Two additional annular grooves 37a, 37b are connected to the suction channel 20 which is illustrated in dotted lines. The load pressure of the traction motors 2,3 can be measured by means of two annular grooves 38a, 38b. The control valve 17 can be actuated electrically or hydraulically, for which purpose corresponding control chamber housings 39a, 39b are fastened to the control seat receptacle 16 or to the axle body 12.

Connected to the damping compartment 33 is an additional pressure channel 40 that leads to a distributor block 41, which in this exemplary embodiment is located on the axle body 12. Located on the distributor block 41 are a plurality of control valves 42a, 42b which are provided for the actuation of additional users, for example of a hydraulic work unit. On a fork lift truck, the control valves 42a, 42b can, for example, be assigned to the "lift" function and to the "tilt" function of a lifting frame. The control valves 42a, 42b are connected to one another in section-like blocks, so that additional control valves can be added, for example for the function of moving a side-loader. The control valves 42a, 42b each have respective connections 43, 44 to which the hydraulic lines that lead to the users are connected. The control valves 42a, 42b can also be actuated hydraulically or electrically. In this exemplary embodiment, the control valves 42a, 42b can be actuated by electromagnets 45, 46.

In the distributor block 41 there are also valves, for example pressure relief valves or flow valves, that are provided to limit the pressure or to limit the flow of hydraulic fluid flowing to the control valves 42a, 42b. The supply line of a hydraulic steering system can also be connected to the distributor block 41. A filter element can also be located in the distributor block 41 or the damping compartment 33.

Located on the housing 4 of the pump 1 is a demand flow regulator 47, which is connected to the damping compartment 33 by a channel 48 in the housing 4 and the control seat receptacle 16. An additional channel 49 is in communication with a load pressure signal channel (not shown), which is connected to the annular grooves 38a, 38b and to a load pressure signal channel located in the distributor block 41, in which channel the load pressure of the steering system or of the user connected to the control valves 42a, 42b is available. The demand current controller 47 is connected to the adjustment cylinder 21 by a hydraulic channel (not shown).

The longitudinal axis 50 of the control valve 17 is perpendicular to the axis of rotation 51 of the pump 1 and perpendicular to the longitudinal axis 52 of the drive axle. The longitudinal axes of the control valves 42a, 42b are thereby parallel to the longitudinal axis 52 of the drive axle.

The control valves 42a, 42b are also constructed on the distributor block 41 so that the connections 43 and 44 face the front body panel 53 of a fork lift truck, for example. The result is short lengths of the hydraulic fluid lines that run from the control valves 42a, 42b to the corresponding users, because on a fork lift truck, these lines are located on the lifting frame and thus in the immediate vicinity of the front body panel 53 and the drive axle.

In the unit of the present invention, the distributor block 41 and the control valves 42a, 42b are located on the axle body 12. With a corresponding configuration of the control seat receptacle 16, it is also possible to attach the distributor block 41 and the control valves 42a, 42b to the control seat receptacle 16. It is also possible to form the control seat receptacle 16 in one piece with the axle housing as its central portion.

In the unit of the present invention, the allocation and distribution of the hydraulic fluid to the individual users occur on the drive axle. That means that it is no longer necessary to have separate hydraulic lines from the pump 1 to the control valves 42a, 42b of the hydraulic work unit. The lines from the control valves 42a, 42b to the users are short. As a result of the integration of the control valve 17 into the control seat receptacle 16 or the axle body 12, there is no longer any need to have an independent valve housing. The result is that the manufacturing costs of a unit of the invention are lower. The installation and assembly as well as the testing of the individual components is simplified. As a result of the elimination of hydraulic lines and the short length of the remaining hydraulic lines, the line losses that do occur are low, as is the corresponding energy loss. Moreover, as a result of the elimination of hydraulic lines and the corresponding threaded connections, the safety and reliability of operation can be increased. The illustrated examples are merely representative of and not restrictive of the present invention. It will be apparent that various modifications may be made to the present invention without departing from the spirit and scope thereof. The scope of the present invention is intended to be defined by the appended claims and equivalents thereto.

We claim:

1. A hydrostatic unit for driving an industrial truck with a pump, hydrostatic propulsion unit and additional users of hydraulic energy, wherein the pump is located on an axle body of a drive axle, and wherein a control valve for pressurizing the propulsion unit and at least one control valve for pressurizing an additional user are located on or are at least partly integrated into the axle body.

2. The hydrostatic unit as claimed in claim 1 wherein the axle body is a control seat receptacle of the pump and of at least one traction motor of the hydrostatic propulsion unit.

3. The hydrostatic unit as claimed in claim 1 wherein the control valves can be actuated electrically or hydraulically.

4. The hydrostatic unit as claimed in claim 1 wherein in the axle body there is a pressure channel that is connected to the outlet of the pump and a suction channel that is connected to a reservoir and is in communication with the inlet of the pump, wherein the pressure channel is connected to the control valve of the propulsion unit and the control valves of the additional users.

5. The hydrostatic unit as claimed in claim 1 further including a priority valve for the priority supply of a user, which priority valve is mounted on or is integrated into the axle body and is located upstream of the control valves.

6. The hydrostatic unit as claimed in claim 1 further including at least one additional valve which is located on or is integrated into the axle body.

7. The hydrostatic propulsion unit as claimed in claim 1 further including pressure relief valves and/or feeder valves located downstream of at least some of the control valves.

8. The hydrostatic unit as claimed in claim 4, wherein the pressure channel is in communication with a damping compartment.

9. The hydrostatic unit as claimed in claim 1 wherein the control valve of the propulsion unit and the control valve of the additional user are piston valves or seat valves.

10. The hydrostatic unit as claimed in claim 1 wherein the control valve of the propulsion unit is integrated into the axle body and the control valves of the additional users are located on the axle housing.

11. The hydrostatic unit as claimed in claim 10 wherein between the axle body or the control seat receptacle and the control valves of the additional users, there is a distributor block in which an additional valve is provided.

12. The hydrostatic unit as claimed in claim 11 further including a filter element.

13. The hydrostatic unit as claimed in claim 12 wherein the filter element is located in the distributor block.

14. An industrial truck comprising:
at least one driven wheel hub for mounting a wheel;
a drive axle supporting the at least one driven wheel hub, the drive axle including an axle body;
a hydrostatic propulsion unit for driving the at least one driven wheel hub;
at least one additional hydraulic system on the industrial truck;
a pump for supplying pressurized fluid to the hydrostatic propulsion unit and the additional hydraulic system;
a control valve for pressurizing the propulsion unit located on or integrated into the axle body; and
at least one control valve for pressurizing the additional hydraulic system located on or integrated into the axle body.

15. The industrial truck of claim 14 wherein the axle body is a control seat receptacle of the pump and of at least one traction motor of the hydrostatic propulsion unit.

16. The industrial truck of claim 14 wherein in the axle body there is a pressure channel that is connected to the outlet of the pump and a suction channel that is connected to a reservoir and is in communication with the inlet of the pump, wherein the pressure channel is connected to the control valve of the propulsion unit and the control valves of the additional hydraulic system.

17. The industrial truck of claim 14 further including a priority valve for the priority supply of a user, which priority valve is mounted on or is integrated into the axle body and is located upstream of the control valves.

18. The industrial truck of claim 14 wherein the control valve of the propulsion unit is integrated into the axle body and the control valves of the additional hydraulic systems are located on the axle housing.

19. A drive axle for a vehicle, said drive axle comprising:
an axle body;
a hydrostatic propulsion unit;
a pump for supplying pressurized fluid to the hydrostatic propulsion unit and to additional hydraulic systems;
a control valve for pressurizing the propulsion unit located on or integrated into the axle body; and
at least one control valve for pressurizing the additional hydraulic system located on or integrated into the axle body.

20. The drive axle of claim 19 wherein the control valve of the propulsion unit is integrated into the axle body and the control valves of the additional hydraulic systems are located on the axle housing.

* * * * *